United States Patent

Cirami

[15] 3,680,487
[45] Aug. 1, 1972

[54] WALKING ROBOT AMUSEMENT RIDE

[72] Inventor: Salvatore Cirami, 36-32 32nd St., Long Island City, N.Y. 11106

[22] Filed: Feb. 20, 1970

[21] Appl. No.: 13,124

[52] U.S. Cl. ................................ 104/53, 46/149
[51] Int. Cl. .................................. A63g 21/04
[58] Field of Search ............ 46/141, 150, 149, 247; 104/53–61

[56] References Cited

UNITED STATES PATENTS

| | | | |
|---|---|---|---|
| 583,109 | 5/1897 | Daniels | 104/61 |
| 3,077,052 | 2/1963 | Gardel | 46/149 |
| 1,439,641 | 12/1922 | Rommer | 46/149 |
| 3,475,857 | 11/1969 | Douglas | 46/247 |
| 2,896,371 | 7/1959 | Ardolino | 46/150 |
| 3,120,197 | 2/1964 | Cirami | 104/53 |

*Primary Examiner*—Drayton E. Hoffman
*Assistant Examiner*—D. W. Keen

[57] ABSTRACT

This invention provides improvements in an amusement roundabout disclosed in my prior U.S. Pat. No. 3,507,222 which discloses a stepping robot secured to and traveling on a guiding and supporting slotted platform type of trackway. The present invention provides a simplified and more rugged construction of the railway truck used to support the robot, specifically in the coupling means connecting the robot to the truck; provision of means to counterbalance the robot's own weight to reduce the normal workload on the stepper; provision of means to limit an excessive workload; and, provision of means to cause the passenger compartment to rock from side to side as a result of and in specific synchronization with the robot's stepping action.

6 Claims, 3 Drawing Figures

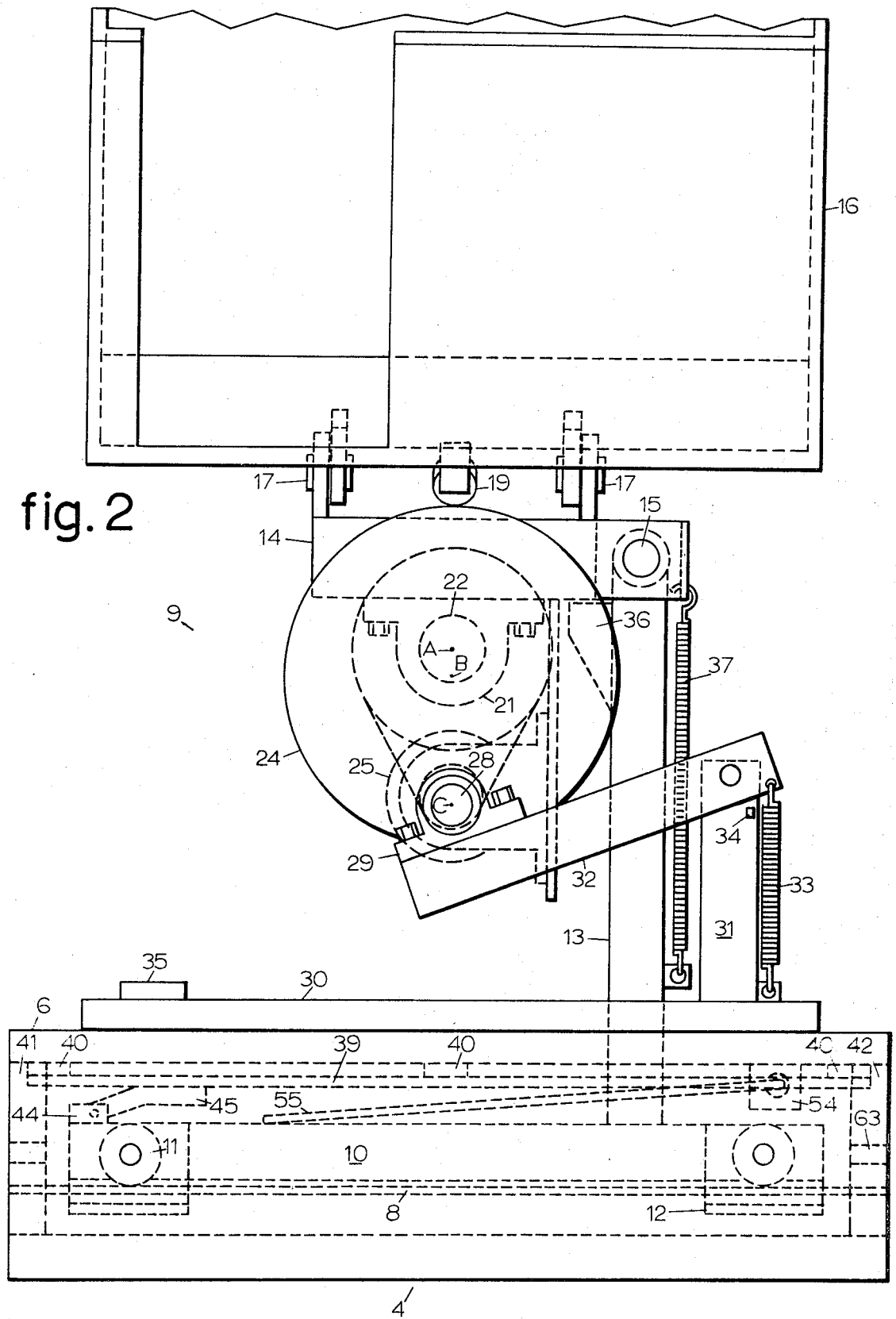

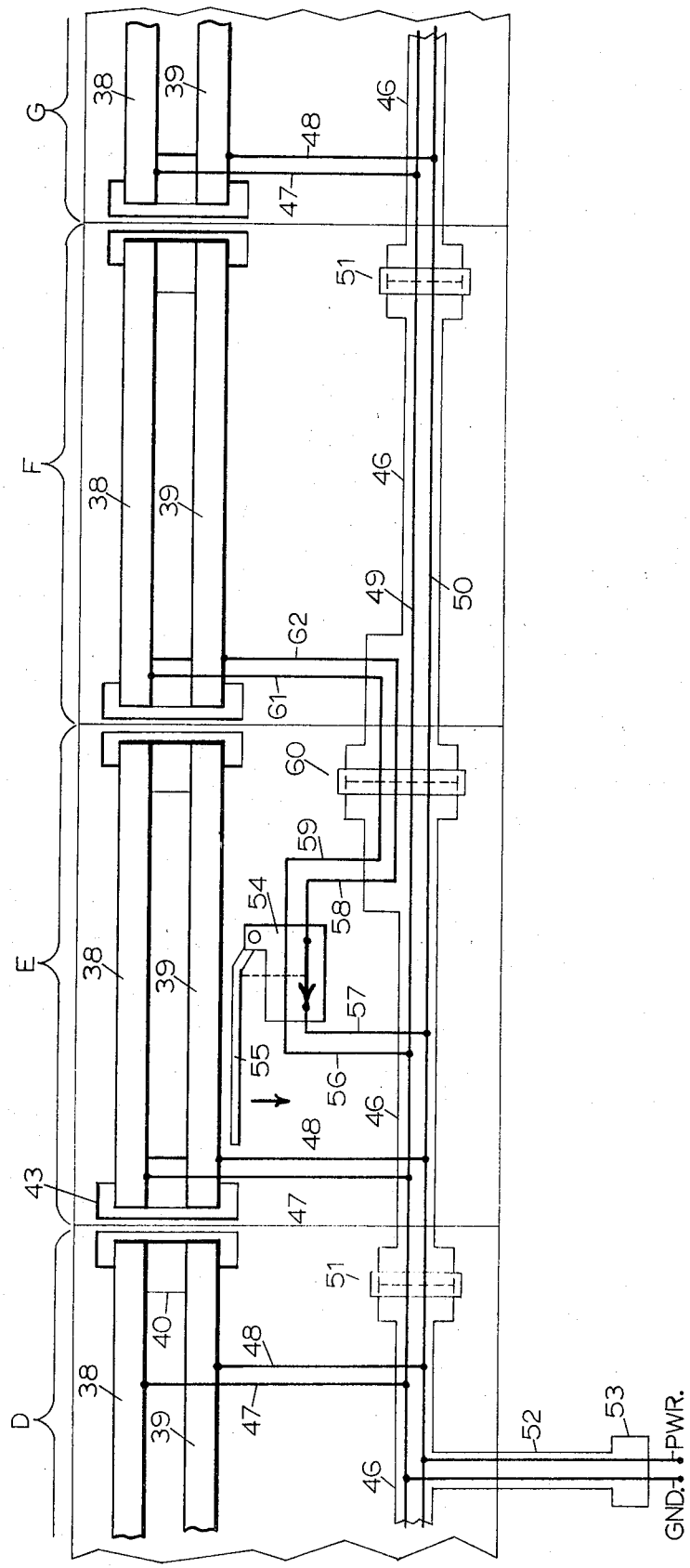

WALKING ROBOT AMUSEMENT RIDE

This invention relates to amusement part roundabouts comprising stepping robots independently secured to a supporting and guiding trackway, as first disclosed in U.S. Pat. Nos. 3,085,516; 3,093,072; and 3,120,197. Improvements in that subject matter are disclosed in allowed patent application Ser. No. 623,371 now U.S. Pat. No. 3,507,222. The present invention pertains to further improvements thereon.

In brief, the present invention provides a simplified and more rugged construction of the railway truck used to support the robot, specifically in the coupling means connecting the robot to the truck; provision of means to counterbalance the robot's own weight to reduce the normal workload on the stepper; provision of means to limit an excessive workload; provision of means to cause the passenger compartment to rock from side to side as a result of the robot's stepping action; provision of more reliable means for providing electric power to the several sections of trackway, with an increase in ease of assembly; and provision of automatic means for insuring adequate spacing between the robots.

Specific objects are

To provide a post member fixed to the rearward end of the railway truck and extending upwardly therefrom through the longitudinally extending division in the treading surface of the trackway and to provide a single pivotal connection between the upper end of the post and the rearward end of a chassis structure to the forward end of which all the other elements of the robot are secured, the chassis structure extending forwardly from the post in a generally horizontal plane with its ends movable up and down. This allows a passenger compartment secured to the forward end of the chassis structure sufficient freedom of elevational movement in response to the action of the stepping mechanism as previously attained through use of a parallelogram structure, but now with fewer elements and points of pivotal connection, thereby increasing ruggedness.

To provide means to counterbalance the robot's own weight thereby reducing the workload on the stepper, by means of a tension spring connected between the post and the rearward end of the chassis structure.

To provide limit means comprising a structural member fixed at one end to the post and extending forwardly therefrom under the chassis structure to prevent the latter from being movable below a given elevation, thereby insuring that excessive passenger weight is, in effect, borne by the post and in turn by the railway truck rather than by the stepper directly.

To provide oppositely offset circular cam members as a functional part of the single crankshaft used to lift, advance, lower and return the foot members of the stepper, and to achieve side to side rocking of the passenger compartment by resting the compartment on the cam members, the compartment being longitudinally pivoted to the chassis structure between the cam members, in an arrangement whereby passenger weight is necessarily shifted toward the side of the load assuming foot member.

In the drawings

FIG. 2 is a side elevational view drawn to the same scale, otherwise hidden parts being represented by dashed lines and the upper end of the passenger compartment being broken away. The view in FIG. 2 terminates at the line 2—2 of FIG. 1, therefore FIG. 2 shows only the left foot member of the robot.

FIG. 3 is a schematic diagram representing several adjoining sections of trackway and their distinct electrical rails and flexible power cords with disconnect plugs, and indicating their electrical relationship; in addition the figure shows the electrical plan for the switch referred to above.

Referring to the drawings more particularly

Figure 1:
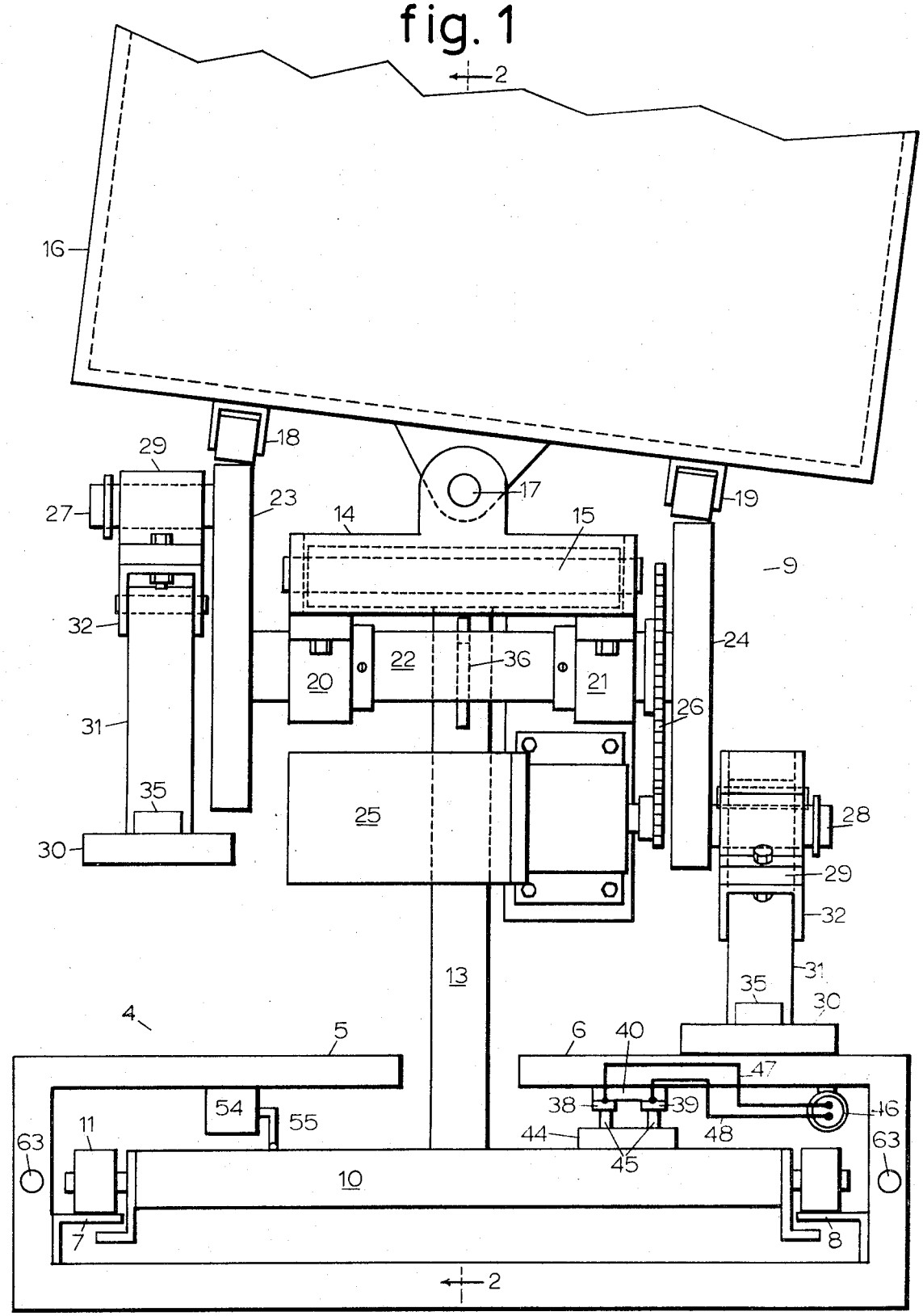
FIG. 1 is a front elevational view of a simplified representation of a robot secured on a section of trackway. The figure shows a broken away portion of a passenger compartment secured to the chassis structure, post and railway structure referred to above, and including the stepping mechanism shown in an extreme position whereby the passenger compartment is caused to lean to one side.

The ride as presently improved comprises a trackway indicated generally as 4, FIGS. 1 and 2, having a longitudinally divided treading surface the separate sides of which are indicated by the numerals 5, 6; a single pair of longitudinally extending parallel guide rails 7, 8 located below the treading surface on each side of the division in same; rider support means indicated generally as 9 standing on the treading surface, and a single railway truck 10 located underneath the rider support and below the treading surface in engagement with the guide rails for longitudinal travel only; the truck being provided with wheels as at 11 and means as at 12 extending under the guide rails for preventing disengagement of the truck from the guide rails.

The present invention departs from previous approaches, for example as shown in U.S. Pat. No. 2,510,241, by restricting the railway truck to provision of a single post member 13 fixed at its lower end to the railway truck and extending upwardly therefrom through the division in the treading surface, and by providing a chassis structure 14 pivotally secured at 15 to the upper end of the post; the chassis structure extending longitudinally and preferably forwardly from the post member in a generally horizontal plane such that the forward free end of the chassis structure is movable up and down.

A passenger compartment 16 is pivotally secured at 17 to the upper side of the chassis structure so as to be movable relative to same only on a longitudinal axis lying in a generally horizontal plane, and is provided with castors 18, 19 spaced apart on opposite sides of the bearings 17.

Secured under the chassis structure in vertical alignment with the castors are pillow block bearings 20, 21 in which is journaled the central or main shaft 22 of a single crankshaft, to the ends of which outboard of said bearings 20, 21 is fixed a pair of circular cams 23, 24 that are eccentrical mounted on the main shaft and are offset with respect to each other 180°. The castors ride on the cams and provide the only lateral support for the passenger compartment, whereby rotation of main shaft 22 by gearmotor 25 through sprockets and roller chain 26 at suitably reduced speed effects rotation of the cams with resultant rocking of the passenger compartment.

In addition, the cams provide support means for minor shafts 27, 28 which are also offset 180° on that radial line determining the maximum offset of the cams. In amplification of this statement, see FIG. 2 in which point A indicates the center around which main shaft 22 rotates, point B indicates the center of the circle describing the circumference of cam 24, and point C indicates the radial center of minor shaft 28. Points A, B and C are on the same straight line.

Comparing FIGS. 1 and 2 it follows that when minor shaft 28 is at a lowermost elevation the passenger compartment will necessarily be rocked toward the side of minor shaft 28, therefore the weight of passengers carried in the compartment is necessarily shifted to the side of the descending minor shaft. It follows that passenger weight is necessarily shifted from side to side in a uniform and continuous manner automatically as a mechanical function occuring with each full rotation of the crankshaft and quite independent of passenger control.

A foot member is pivotally secured onto each minor shaft, each foot member comprising a structure having a pillow block bearing 29, a base member 30 and means resiliently supporting the bearing 29 above the base, in this instance, a post member 31 fixed to the base, an arm member 32 pivotally connected at one end to post 31 and extending longitudinally therefrom with its free end supporting bearing 29 and movable in a vertical plane, and including an extension spring 33 tending to drive the foot bearing upwardly to the limit allowed by the stop member 34, FIG. 2. The foot member is designed to hang in pivotal balanced dependence from the minor shaft that carries it, and to indicate one means for insuring same a balance weight 35 is shown secured to the base member 30.

Rotation of the cams by the gearmotor results in the minor shafts being alternately lifted, advanced, lowered and returned. The full cycle is of course 360°. For the upper 180° a given foot member is considered as being lifted and advanced, and for the lower 180° of the full cycle a given foot member is considered as being lowered and returned. To insure traction between a foot member and the treading surface only on the lower half of the cycle means must be provided for limiting the minimum elevation of the main shaft 22 above the treading surface such that it does not lie below that horizontal plane in which both foot member bearings 29 lie simultaneously when the foot members are both in contact with the treading surface; i.e., when the passenger compartment is level and neither foot member is in the relatively lifted or lowered position.

For this purpose a limit member is provided fixed to the post member 13 and extending longitudinally therefrom under the chassis structure 14 so as to provide stop means preventing the free end of the chassis structure from being pivotable below the desired minimum elevation.

The spring 33 serves as a shock absorber that is effective during the lower 180° rotation of the crankshaft, functioning to reduce the impact of the base member 30 on the treading surface, thereby reducing shock transmitted to the crankshaft and to the passengers. However, depending on the tension of the spring 33 the chassis structure will tend to "climb" or be lifted, its elevation being greatest when a minor shaft, as for example 28, is at the lowermost position. The chassis structure in FIGS. 1 and 2 is shown in a level position to represent the situation that exists only when the passenger compartment is under extreme load and the spring 33 must provide for freedom of movement of the minor shaft by allowing the foot member bearing to be depressed to its extreme position. The limit member 36 therefore serves a double function: that of preventing traction between the foot members and the treading surface on the upper half of the operating cycle, thereby contributing to efficient operation; and that of effectively transferring excessive passenger weight to the railway truck 10 through the medium of the post member 13.

Under conditions of less than extreme loading it is desired to permit elevational movement of the forward free end of the chassis structure so as to impart a floating movement to the robot whereby it appears to move lightly and without effort, thereby enhancing the lifelike illusion. To attain this objective a counterbalance tension spring 37 is connected between the post member 13 and the chassis structure 14 on the rearward end of same behind the pivot 15, FIG. 2. The tension of the spring is such as to offset most of the unladen weight of the robot, i.e., the chassis structure and all the mechanical elements connected to and movable with it, allowing a few pounds of effective weight to insure adequate traction when no passengers are carried.

The present invention contemplates a modification of the structure in FIGS. 1, 2 in which the robot is normally inclined forwardly; i.e., either the chassis structure inclines downwardly from pivot 15, or the forward end of the longitudinal axis passing through pivots 17 is at a lower elevation than the rearward end of said axis. The advantage gained is that of dividing the arcuate movement of the passenger compartment, such that when a robot that is not excessively loaded, lifts, it will not appear to be rearing backward only, but will instead appear to be nodding both forward and backward as the vehicle advances. This further enhances the desired life-like illusion and decreases the rearward angular displacement of passengers.

The trackway includes electrical ground and power rails 38, 39 respectively, supported by insulating blocks as at 40 which are secured to the underside of the treading surface, the ground and power rails thereby overhanging the railway truck. In this position the tendency for grit and debris to accumulate on the electrical rails is minimized thereby enhancing electrical reliability. In addition, these rails terminate short of the ends of the trackway, see FIG. 2, in which clearance spaces 41, 42 are provided. As a result rain water seeping between temporarily joined adjacent sections does not pour directly onto the current rails. To prevent water from flowing along the structure of the treading surface onto the insulator blocks and from same onto the rails, an opening as at 43, FIG. 3 is provided in the structure of the treading surface, specifically in the underside portion thereof only, said opening providing an edge along which the water drips off; the ends of the electrical rails thereby extending into free space.

To the railway truck is secured electrical power pickup means 44 having ground and power contacts 45 that slide along the current rails. Electrical connections not shown are made between the power pickup 44 and the motor 25 utilizing the truck 10 and the post member 13 for support of the necessary wiring, the wiring being flexible to follow vertical movement of the chassis structure.

While FIGS. 1 and 2 show only a single straight section of trackway, the ride actually comprises a plurality of trackway sections temporarily fastened together to form a continuous closed loop, either in a circular or other layout, for example, by bolting adjoining sections together utilizing openings as at 63, FIGS. 1, 2.

Since the ride is intended to be particularly well adapted for compact storage for carnival or other portable operations in which the trackway is frequently disassembled and reassembled, it is desirable to provide means for facilitating the provision of electrical continuity between the ground and power rails of one section of trackway with those of adjoining sections, in the sense that the connections should be easy to make. This objective is attained by providing each section of trackway with a length of power cord at least the ends of which are flexible and to the ends of which are provided quick disconnect plugs; i.e., a male section or half of the plug at one end of the power cord and a female half of the plug at the other end, intended for connection to mating sections of the plugs provided in adjoining sections of trackway. The several lengths of power cord are secured centrally of their length to their respective trackway sections, preferably under the treading surface and near one outboard side of the trackway, in which position they are protected from the weather and physical damage and are accessible, whereby the flexible ends of the power cords in adjoining sections of trackway can be grasped and plugged together.

In FIG. 1, the flexible power cord 46 is represented schematically and the numerals 47, 48 represent insulated electrical wires providing ground and power connections, respectively, between the electrical rails 38, 39 and the current supplying power cord 46. The heavy dots within the power cord 46, FIG. 1 represent a cross-sectional view of the ground and power supply wires that extend longitudinally within the cord. In FIG. 3 the wires inside the power supply cord are indicated by the numerals 49, 50 referring respectively to the ground and power wire. The numeral 51 indicates generally a mated male and female plug schematically represented by double rectangles to indicate the commonly available type of plug having a freely rotatable internally threaded screw shell that fastens the two halves together.

Referring still to FIG. 3, one section of trackway D is provided with an additional power cord 52 that is spliced into power cord 46 at one end and provided with a male plug 53 at its free end for attachment to a source of power.

All other sections of trackway except two are provided as shown by section G. The exceptions are next explained.

In practice, the robots may travel at slightly different speeds due to variations in individual motors and variations in passenger load carried, therefore it is desirable to provide means for insuring adequate spacing between consecutive vehicles. For this purpose a switch 54, FIGS. 1, 2 is provided secured to the underside of one section of trackway only, the remaining sections not normally requiring this device unless the trackway layout is of exceptionally long overall length. The switch is provided with a long rod 55 extending substantially the length of the trackway section in which the switch is located.

When a given robot moves onto that section of trackway its supporting railway truck engages the rod thereby actuating the switch and removing power from another and adjoining section of trackway immediately following the one in which the robot and switch 54 are located. A second robot, following too closely behind the first is thereby stopped as soon as it enters upon the powerless section of trackway. In practice, this involves only a matter of seconds, for as soon as the first robot has moved on and released switch 54 allowing it to return to its normally electrically closed position, power is returned to the second robot and it continues on its way.

The function of switch 54 therefore is simply to regulate the spacing between the robots on each successive pass around the closed loop of trackway. The possibility of moving robots piling up behind one that is momentarily stopped is prevented simply by avoiding use of too many robots on a given overall length of trackway and by initially positioning them on the layout such as to allow several sections of trackway between successive vehicles.

These two special sections of trackway are represented schematically in FIG. 3 in which section E is the one containing switch 54 having rod 55 which in FIG. 3 must be moved downwardly as indicated by the arrow to actuate the switch to the open circuit condition. Wires 56, 57 provide ground and power connections, respectively, between the supply wires 49, 50 in power cord 46 and the input side of switch 54, and wires 58, 59 connect the output side of the switch to one side of a special plug 60 having four terminals instead of the two employed by plugs 51.

Trackway section F is the second special section. It alone is not electrically connected directly to the power cord located within its structure. Instead, its rails 38, 39 are connected by wires 61, 62 through plug 60 and switch 54 to the power cord in trackway section E. Note that rails 38, 39 in section E are connected directly to the power cord in section E.

I claim:

1. In an amusement roundabout providing a treading surface, a stepping vehicle secured to combination guidance and support means for travel on said treading surface, in which said vehicle includes means for passenger support, a motor, a pair of foot members and motor driven means to alternately lift, advance, lower and return said foot members, in which said foot members include base members in frictional contact with said treading surface and said foot members are resiliently constructed such as to allow relative elevational movement between said motor driven means and said foot members, and in which said guidance and support means is adapted to allow elevational movement of said passenger support means in response to the lifting and lowering of said foot members; the combination with same of:

limit means adapted to restrict the lowermost elevation of said passenger support means relative to said treading surface so as to limit the maximum passenger load borne by the resilient foot members, said limit means including a rigid member fixed at one end to said support means at an elevationally stationary place on same, and having a free end extending therefrom and arranged to engage structure elevationally movable with said motor driven means.

2. A combination as recited in claim 1, in which:
said guidance and support means comprises trackway means providing a longitudinally divided treading surface, longitudinally extending parallel guide rails located below said treading surface on opposite sides of the division in same, a railway truck positioned below the treading surface and provided with means for engaging the guide rails for longitudinal travel on same, and a post member fixed at its lower end to the railway truck and extending upwardly therefrom through the division in the treading surface;
in which said stepping vehicle includes a chassis structure pivotally connected at one end only to the upper end of said post member such that the opposite free end of the chassis structure is movable up and down only in a segment of an arc having its center in a horizontal axis lying perpendicular to the division in the treading surface, in which vehicle said motor is mounted in a manner movable with said chassis structure, said motor driven means is secured in dependence from said chassis structure near the elevationally movable free end thereof, and said passenger support means is secured to the upper side of said chassis structure;
and in which said rigid member of the limit means is fixed at one end to said post member and extends longitudinally therefrom such that the free end of the rigid member underlies said chassis structure in a position preventing further downward movement of the free end of the chassis structure when it is pivoted to a given lowermost elevation.

3. In combination with claim 2:
counterbalance means including a spring connected at one end to said chassis structure at an elevationally movable place on same and connected at its other end to means fixed to said railway truck, the combination being so constructed and arranged that forcible flexure of the spring at the truck supported end tends to drive said chassis structure upwardly such as to partially reduce the effective weight of the unladen vehicle.

4. A stepping robot amusement vehicle intended for use with guidance and support means, said vehicle comprising:
a chassis structure having an upper side and an underside and which is suitable in construction for attachment to said guidance and support means;
a single rotatable crankshaft having a straight horizontally disposed central main shaft and bearing means to support said main shaft secured in dependence from the underside of said chassis structure;
a reduction gearmotor secured to said chassis structure, power transmission means connecting said motor to said main shaft for rotation of same, said crankshaft having oppositely offset minor shafts; a single pair of foot members secured to said minor shafts and adapted to hang in pivotal balanced dependence therefrom, each of said foot members including bearing means for receipt of one of said minor shafts supported by suitable structure at an elevation above an elongated base member adapted to secure traction on a treading surface, the combination being so constructed and arranged that rotation of said crankshaft at reduced speed by said gearmotor results in said foot members being alternately lifted, advanced, lowered and returned in spaced apart parallel vertical planes and in opposed relationship with respect to each other;
a passenger compartment having an upper portion and an underside portion and pivotally secured at its underside to the upper side of said chassis structure for movement on a longitudinal generally horizontal axis lying between and parallel to said vertical planes such that the upper portion of the compartment is pivotable laterally only toward each of said vertical planes;
and, motion transmission means adapted to rock said passenger compartment from side to side in a uniform cycle an equal number of degrees on opposite lateral sides of said longitudinal axis as a result of and in specific synchronization with the operation of said foot members such that passenger weight is necessarily shifted toward the side of the load assuming foot member, said motion transmission means being arranged between said main shaft and the underside of said passenger compartment and adapted to convert the rotary motion of the main shaft into a uniformly reciprocating lateral motion of the upper portion of said passenger compartment.

5. A combination as recited in claim 4, in which:
said motion transmission means comprises a single pair of circular cam members of equal diameter fixed to said main shaft and oppositely offset with respect to same in the same direction as said minor shafts, said cam bembers being spaced apart on said main shaft an equal distance on opposite sides of said longitudinal axis, and constructed large enough in diameter that the perimeter of each cam member at the uppermost point thereof engages friction reducing means secured to the underside of said passenger compartment, the arrangement being such that said cam members provide the only lateral support for the passenger compartment so that the upper portion of the compartment is necessarily rocked from side to side by the opposed lifting and lowering action of the cooperating cam members against the underside of the passenger compartment as the crankshaft is rotated, said cam members being sufficiently large in diameter as to provide operating clearance between the underside of the passenger compartment and each of said foot member bearing means when the foot members are lifted to their highest elevation.

6. An amusement ride comprising:
trackway means providing a longitudinally divided treading surface, longitudinally extending parallel guide rails located below said treading surface on opposites sides of the division in same, a railway truck positioned below the treading surface and provided with means for engaging the guide rails for longitudinal travel on same, and a post member fixed at its lower end to the railway truck and extending upwardly therefrom through the division in the treading surface;
a vehicle having a chassis structure pivotally connected at one end only to the upper end of said post member such that the opposite free end of the chassis structure is movable up and down only in a segment of an arc having its center in a horizontal axis lying perpendicular to the division in the treading surface, a motor carried by said vehicle, motor driven traction means secured in dependence from said chassis structure near the elevationally movable free end thereof;

means for passenger support secured to the upper side of said chassis structure;

and, counterbalance means including a spring connected at one end to said chassis structure at an elevationally movable place on same and connected at its other end to means fixed to said railway truck, the combination being so constructed and arranged that forcible flexure of the spring at the truck supported end tends to drive said chassis structure upwardly such as to partially reduce the effective weight of the unladen vehicle.

* * * * *